2,955,912
METHOD OF PRODUCING URANIUM DIOXIDE

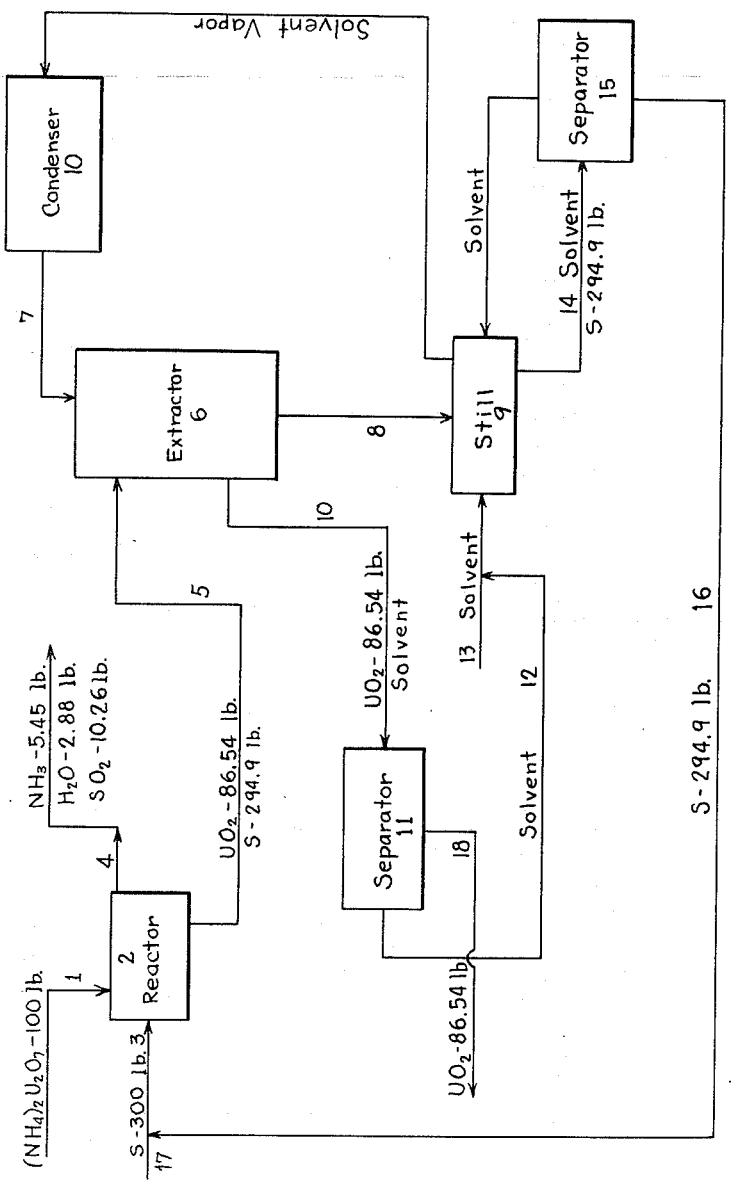

James R. West and Edgar L. Kochka, Pittsburgh, Pa., assignors to Texas Gulf Sulphur Company, New York, N.Y., a corporation of Texas Filed Oct. 2, 1957, Ser. No. 687,835

5 Claims. (Cl. 23—14.5)

This invention relates to the production of uranium dioxide and more specifically to its production from uranates, polyuranates, uranium trioxide, uranosic oxide and uranyl nitrate and similar salts by reaction with liquid sulphur.

Uranium dioxide is in demand for reactor fuel elements, for ceramic materials, and for other uses. Prior to this invention the production of uranium dioxide from uranates, polyuranates and higher uranium oxides has been expensive and cumbersome, and among the objects of this invention is the replacement of the prior art techniques with a simplified and economical system.

Uranium concentrates, to which the method of the present invention as well as those of the prior art are adapted, are obtained from uranium ore such as uraninite and carnotite by chemical leaching, separation of the dissolved uranium compounds and then precipitation, filtration and drying of the uranium concentrate, referred to as yellow cake, containing about 75% $U_3O_8$. The precipitation is usually effected with ammonia or sodium hydroxide, whereby the corresponding diuranates are obtained. Both are known as the "uranium yellow" of commerce or, in the recovery of uranium from its ores as "yellow cake."

As indicative of the methods used in the art, attention is directed to a description of a process appearing in the January 1957 issue of "Chemical Engineering." By this process ammonium diuranate is dried and then pyrohydrolized at 600° C. in an electric oven with steam to uranosic oxide ($U_3O_8$). The latter compound is then reduced with hydrogen at a high temperature to form uranium dioxide.

We have found that, in place of the above cumbersome two step process involving the use of temperatures above 600° C. and steam and hydrogen we can convert uranates, polyuranates, uranium dioxide, uranosic oxide and uranyl salts to uranium dioxide by treating them with liquid sulphur at a moderate temperature below the boiling point of sulphur.

The following reactions are probably those that occur in our process, although the success of the process, as demonstrated by the examples which follow, does not depend on the accuracy of the equations

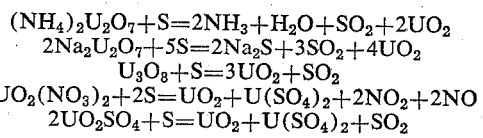

In carrying out our process we may operate at temperatures in the range of about 200° C. to the boiling point of sulphur. However at 200° C. the reaction is extremely slow, whereas conversions of the starting materials to 75–100% theoretical quantities of uranium dioxide can be effected rapidly, i.e. in 3–8 hours, at temperatures between 350 and 400° C. In order to obtain the most effective results we prefer to treat the uranium compound starting material in the presence of from about 2 to about 10 times its weight of liquid sulphur, under which conditions the sulphur acts as a suspending medium for the uranium compound and provides intimate contact of the uranium concentrate and the sulphur. While we prefer for reasons of convenience to operate at atmospheric pressure, the process is also operative at sub-atmospheric and super-atmospheric pressures, the latter making possible the use of higher temperatures than the boiling point of sulphur at atmospheric pressure. Our process can be operated either batch-wise or continuous and in either case the sulphur can be separated from the uranium dioxide produced either by extraction with a solvent of sulphur, such as carbon disulphide, benzene, toluene, xylene, tetrachloroethylene and the like, by distillation of the remaining sulphur from the reaction product, or by other methods such as autoclaving and flotation, or filtration followed by separation of sulphur from the filter cake by solvent extraction or distillation.

The following are examples of the use of our process. They are merely exemplary and are not intended by way of limitation.

Example 1

50 parts by weight of uranosic oxide ($U_3O_8$) were suspended in 400 parts of liquid sulphur at 400° C. The reaction mixture was maintained at this temperature with stirring for 7 hours, after which it was cooled and the remaining sulphur extracted with carbon disulphide. An X-ray analysis of the residue showed it to be a substantially quantitative yield of uranium dioxide ($UO_2$).

Example 2

50 parts of ammonium diuranate (prepared by adding ammonium hydroxide to a nitric acid solution of uranosic oxide) was reacted by suspending it with stirring in 400 parts of liquid sulphur for 5 hours at 350° C. Vigorous evolution of vapors and fumes was observed. After the reaction product was cooled sulphur was removed therefrom by extraction with carbon disulphide leaving a residue which weighed slightly more than the diuranate charged. The residue appeared to be a mixture and water extraction removed about 5% of soluble material based on the residue. The final residue was shown by X-ray analysis to contain about 75% of uranium dioxide and 25% of uranosic oxide.

Example 3

50 parts of commercial Rio Tinto uranium concentrate (sodium diuranate) was added with stirring to 400 parts of liquid sulphur at 350° C. and stirring of the suspension was continued at that temperature for 5 hours. Then the reaction mixture was cooled and sulphur and sodium sulphide removed by carbon disulphide and water extraction, respectively. Examination of the product by X-ray diffraction indicated complete conversion to uranium dioxide. A material balance showed that the uranium dioxide in the recovered material was more than 99% of the theory based on the concentrate charged to the reaction.

Example 4

50 parts of commercial ammonium diuranate was reacted by suspending it with stirring in 400 parts of liquid sulphur for 6½ hours at 350° C. The fumes evolved gave an acid test over the entire reaction period. Sulphur was removed from the cooled reaction mixture by carbon disulphide extraction and a sulphur-free residue weighing 93.2 percent of the ammonium diuranate charged was obtained. Five and six-tenths percent of the sulphur-free residue was water soluble, however, the yellow solution probably contained unreacted ammonium diuranate since no evidence could be obtained for the presence of sulphide ion in solution. An X-ray analysis identified the final residue as uranium dioxide.

*Example 5*

75 parts of uranyl nitrate hexahydrate was ground to a fine powder that was suspended with stirring in 400 parts of liquid sulphur for 6 hours at 350° C. Brown and yellow fumes, typical of nitric oxide and nitrogen dioxide, were evolved during the run. The cooled reaction mixture was subjected to carbon disulphide and water extractions. The dark green water solution indicated the reduction of the uranyl ion to uranium having a valence of four. A test made on the solution for nitrate ions gave negative results; however, the solution was rich in sulphate ions. The 20 parts of residue was found by X-ray analysis to consist entirely of uranium dioxide.

*Example 6*

75 parts of uranyl sulphate trihydrate was ground to a fine powder that was suspended with stirring in 400 parts of liquid sulphur for 6½ hours at 350° C. The cooled reaction mixture was extracted with carbon disulphide and then with water. The 15 parts of residue obtained was found by X-ray analysis to be entirely uranium dioxide. The dark green water solution contained mainly uranium having a valence of four, some uranium having a valence of six, and the sulphate ions. On standing exposed to the atmosphere the uranium having a valence of four was oxidized to uranium having a valence of six and a yellow water solution of uranyl sulphate was obtained.

While the examples given above show the use of our process on various starting materials by the batch process, the fact that the process is conducted while the uranium concentrate is suspended in molten sulphur makes it easily applicable to continuous operation. The drawing shows a typical material flow diagram for the use of our process in the continuous production of uranium dioxide, applied to ammonium diuranate.

Referring to the drawing 100 lbs. of ammonium diuranate per hour is charged through line 1 to reactor 2, where it is suspended in 3 times its weight of sulphur. The reactor may be of any conventional type for maintaining suspensions of solids and liquids at elevated temperatures and may in its simplest form consist of a vertical tank with paddle type stirrers. The temperature in the reactor, which may be maintained by tubes, high pressure steam jacket or otherwise is preferably in the range 350-400° C., with a corresponding residence time of 6 to 8 hours. However, temperatures as low as 200° C. may be used if the reactor is large enough to provide a very long reaction time. Higher temperatures than 400° C. may be used, although we find that 400° C. is optimum in that it is below the boiling point of sulphur at atmospheric pressure and high enough to effect a substantially quantitative reaction in commercially attractive residence time without excessive foaming due to too rapid evolution of gas. The 300 lbs. per hour of sulphur which is introduced to the reactor through line 3, preferably at a point below the level of the reaction mixture, consists for the most part of approximately 295 lbs. per hour of recycled sulphur recovered in the process, the rest being make-up sulphur from an extraneous source. The lines conducting sulphur should be heated or well insulated as it is preferred to transport the sulphur in liquid phase. The reactor is equipped with a vapor line 4 for release of vapors produced during the reaction. Per 100 lbs. of ammonium diuranate charged, vaporous by-products will be approximately 5.45 lbs. of ammonia, 2.88 lbs. of water and 10.26 lbs. of sulphur dioxide. Through line 5, which is connected near the bottom of reactor 2, there is drawn off about 86.54 lbs. of uranium dioxide suspended in 294.9 lbs. of sulphur, and this mixture is passed into extractor 6 which may be a unit of the Soxhlet type or other conventional equipment known in the extraction art. A suitable solvent, such as hot xylene is admitted to extractor 6 through line 7. After contacting the reaction mixture in the extractor the hot solvent, rich in dissolved sulphur, is passed through line 8 to still 9. The uranium dioxide is removed from the extractor through line 10 and passed to separator 11, where any solvent still associated with the product is stripped off and returned to still 9 through line 12, together with make-up solvent added as needed by line 13.

In still 9 most of the solvent is evaporated, the vapors being passed to condenser 10 whence they are returned by line 7 to extractor 6. The recycle sulphur, accompanied by some solvent, flows through line 14 to separator 15 where the last traces of solvent are substantially removed from the sulphur which is then returned through line 16 to line 3 and thence to reactor 2. Make-up sulphur, as required, is added by means of line 17. The product uranium dioxide in the amount of approximately 86.54 lbs. for each 100 lbs. of ammonium diuranate reacted is removed from separator 11 through line 18.

In treating sodium diuranate by our novel process the material flow will be very similar to that shown for ammonium diuranate except that no ammonia will be produced and that the solid reaction product after removal of sulphur will be a mixture of sodium sulphide and uranium dioxide, which will necessitate a hot water extraction or other step for the separation of sodium sulphide from the desired product.

Similar modifications of the material flow diagram where uranosic oxide, uranyl nitrate or other uranyl salts are charged will be readily apparent to those versed in the art.

While we have referred above to specific starting materials, it should be understood that our process of preparing uranium dioxide from uranium concentrates by treating the same with liquid sulphur can be applied to any oxygen-containing uranium composition where the uranium has a higher valence than four.

We claim:

1. A process for producing uranium dioxide from an oxygen-containing compound of uranium in which the uranium has a valence greater than four which comprises treating the uranium compound with liquid sulfur at a temperature of about 350° to 400° C.

2. The process of claim 1 wherein the uranium compound is uranosic oxide.

3. The process of claim 1 wherein the uranium compound is sodium diuranate.

4. A process for producing uranium oxide from a compound of uranium having a valence greater than four which comprises treating the uranium compound with liquid sulfur at a temperature of about 350° to 400° C. and for a period of about 3 to 8 hours.

5. The process of claim 4 wherein the uranium compound is uranosic oxide.

References Cited in the file of this patent

Friend: "Textbook of Inorganic Chemistry", vol. VIII, part III, pages 304, 307 (1926), Charles Griffin & Co., Ltd., London.

Mellor: "Comprehensive Treatise on Inorganic and Theoretical Chemistry", vol. 12, pages 40, 49 (1932), Longmans, Green & Co., London.